(12) United States Patent
Scherich et al.

(10) Patent No.: US 12,544,490 B2
(45) Date of Patent: Feb. 10, 2026

(54) ANTI-THROMBOGENIC CATHETER ASSEMBLY AND RELATED METHODS

(71) Applicant: Becton, Dickinson and Company, Franklin Lakes, NJ (US)

(72) Inventors: Megan Scherich, Salt Lake City, UT (US); Yiping Ma, Layton, UT (US); He Bai, Sandy, UT (US); Jonathan Karl Burkholz, Salt Lake City, UT (US); Hua Zhang, South Jordan, UT (US); Weston F. Harding, Lehi, UT (US); Curtis H. Blanchard, Riverton, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 875 days.

(21) Appl. No.: 17/146,410

(22) Filed: Jan. 11, 2021

(65) Prior Publication Data

US 2021/0228781 A1    Jul. 29, 2021

Related U.S. Application Data

(60) Provisional application No. 62/965,635, filed on Jan. 24, 2020.

(51) Int. Cl.
*A61M 39/10* (2006.01)
*A61L 29/08* (2006.01)
(Continued)

(52) U.S. Cl.
CPC ............. *A61L 29/16* (2013.01); *A61L 29/085* (2013.01); *A61L 31/10* (2013.01); *A61L 31/16* (2013.01);
(Continued)

(58) Field of Classification Search
CPC . A61M 25/007; A61M 25/0009; A61M 25/00
See application file for complete search history.

(56) References Cited

U.S. PATENT DOCUMENTS 4,925,445 A * 5/1990 Sakamoto ............. A61L 31/022
604/528
5,013,306 A   5/1991 Solomon et al.
(Continued)

FOREIGN PATENT DOCUMENTS

CN    102553068 A    7/2012
CN    104039384 A    9/2014
(Continued)

*Primary Examiner* — Theodore J Stigell
(74) *Attorney, Agent, or Firm* — The Webb Law Firm (57) ABSTRACT

A catheter assembly may include a catheter adapter, which may include a distal end, a proximal end, and a lumen extending through the distal end of the catheter adapter and the proximal end of the catheter adapter. The catheter assembly may include a catheter extending distally from the distal end of the catheter adapter. The catheter assembly may include an introducer needle extending through the catheter. An anti-thrombogenic material may be extruded through a die and/or molded to form one or more portions of the catheter assembly. Additionally or alternatively, inner surfaces and/or outer surfaces of one or more portions of the catheter assembly may be coated with an anti-thrombogenic coating that includes the anti-thrombogenic material.

16 Claims, 6 Drawing Sheets

(51) Int. Cl.
*A61L 29/16* (2006.01)
*A61L 31/10* (2006.01)
*A61L 31/16* (2006.01)
*A61L 33/00* (2006.01)
*A61L 33/06* (2006.01)
*A61M 25/00* (2006.01)
*A61M 25/06* (2006.01)

(52) U.S. Cl.
CPC ......... *A61L 33/0094* (2013.01); *A61L 33/068* (2013.01); *A61M 25/0045* (2013.01); *A61M 25/0051* (2013.01); *A61M 25/0606* (2013.01); *A61M 39/10* (2013.01); *A61L 2300/42* (2013.01); *A61M 2039/1072* (2013.01); *A61M 2039/1077* (2013.01)

(56) References Cited

U.S. PATENT DOCUMENTS

| | | | |
|---|---|---|---|
| 9,750,928 B2* | 9/2017 | Burkholz | A61M 25/0097 |
| 11,504,505 B2 | 11/2022 | Harding et al. | |
| 2004/0210208 A1 | 10/2004 | Paul et al. | |
| 2005/0142162 A1* | 6/2005 | Hunter | A61L 31/16 |
| | | | 424/423 |
| 2005/0256461 A1* | 11/2005 | DiFiore | A61M 39/26 |
| | | | 604/537 |
| 2006/0229573 A1* | 10/2006 | Lamborne | A61M 25/007 |
| | | | 604/263 |
| 2008/0172011 A1* | 7/2008 | Heroux | A61M 25/0045 |
| | | | 604/265 |
| 2011/0009831 A1* | 1/2011 | Burkholz | A61P 31/04 |
| | | | 427/2.3 |
| 2013/0165868 A1* | 6/2013 | Isaacson | A61M 25/0693 |
| | | | 29/428 |
| 2016/0038657 A1* | 2/2016 | Lareau | A61M 1/3659 |
| | | | 604/266 |
| 2017/0056639 A1* | 3/2017 | Ma | A61M 25/002 |
| 2017/0065750 A1* | 3/2017 | Ma | A61M 25/0045 |
| 2021/0001012 A1 | 1/2021 | Takemura | |
| 2021/0198516 A1* | 7/2021 | Locklin | C09D 133/10 |

FOREIGN PATENT DOCUMENTS

| | | |
|---|---|---|
| CN | 204972644 U | 1/2016 |
| CN | 215690849 U | 2/2022 |
| EP | 0404517 | 12/1990 |
| EP | 0472413 A2 | 2/1992 |
| JP | H0824326 A | 1/1996 |
| JP | 2019162452 A | 9/2019 |
| WO | 2019187860 A1 | 10/2019 |

* cited by examiner

ANTI-THROMBOGENIC CATHETER ASSEMBLY AND RELATED METHODS

RELATED APPLICATION

This application claims the benefit of U.S. Provisional Patent Application No. 62/965,635, filed Jan. 24, 2020, and entitled ANTI-THROMBOGENIC CATHETER ASSEMBLY AND RELATED METHODS, which is incorporated herein in its entirety.

BACKGROUND

Catheters are commonly used for a variety of infusion therapies. For example, catheters may be used for infusing fluids, such as normal saline solution, various medicaments, and total parenteral nutrition, into a patient. Catheters may also be used for withdrawing blood from the patient.

A common type of catheter is an over-the-needle peripheral intravenous ("IV") catheter. As its name implies, the over-the-needle catheter may be mounted over an introducer needle having a sharp distal tip. A catheter assembly may include a catheter adapter, the catheter extending distally from the catheter adapter, and the introducer needle extending through the catheter. The catheter and the introducer needle may be assembled so that the distal tip of the introducer needle extends beyond the distal tip of the catheter with the bevel of the needle facing up away from skin of the patient. The catheter and introducer needle are generally inserted at a shallow angle through the skin into vasculature of the patient.

In order to verify proper placement of the introducer needle and/or the catheter in the blood vessel, a clinician generally confirms that there is "flashback" of blood in a flashback chamber of the catheter assembly. Once placement of the needle has been confirmed, the clinician may temporarily occlude flow in the vasculature and remove the needle, leaving the catheter in place for future blood withdrawal or fluid infusion.

Infusion and blood withdrawal using the catheter may be difficult for several reasons, particularly when an indwelling time of the catheter is more than one day. A fibrin sheath or thrombus may form on an internal surface of the catheter assembly, an external surface of the catheter assembly, or within the vasculature near the distal tip of the catheter. The fibrin sheath or thrombus may block or narrow a fluid pathway through the catheter, which may impair infusion and/or collection of a high-quality blood sample.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure relates generally to a catheter assembly that includes one or more anti-thrombogenic portions, as well as related systems and methods. In some embodiments, the catheter assembly may facilitate patency, fluid infusion, and blood draw by one or more of the following: 1) reducing trauma-induced and/or stasis-induced thrombus development; 2) reducing an amount of blood disposed within a fluid path of the catheter assembly; and 3) preventing or delaying thrombus development and attachment to a catheter or another portion of the catheter assembly. In some embodiments, one or more portions of the catheter assembly may include an anti-thrombogenic material, which may reduce a likelihood of formation of a fibrin sheath or thrombus on an internal surface of the catheter assembly, an external surface of the catheter assembly, or within a vein near a distal tip of the catheter. In some embodiments, the anti-thrombogenic material may include one or more anti-thrombogenic compounds. In some embodiments, the anti-thrombogenic material may include an anti-thrombogenic polymer. In some embodiments, the anti-thrombogenic material may include a polymer with one or more antithrombogenic compounds.

In some embodiments, a length of the catheter of the catheter assembly may be extended, which may facilitate infusion and blood draw success by moving the distal tip of the catheter further from the fibrin sheath or thrombus that may be present. In some embodiments, the length of the catheter may be extended to orient the catheter parallel to the vein or generally parallel to the vein, which may reduce a risk of an occlusion of the catheter by a wall of the vein and/or a risk of thrombus on the wall of the vein. In some embodiments, the length of the catheter may be extended to increase access to deeper and larger veins with higher blood flow and more favorable vein diameter ratios for a particular size of catheter, which may reduce a likelihood of stasis-related thrombus development. In some embodiments, a gauge of the catheter may be between 26G and 10G, inclusive. In some embodiments, a length of the catheter or a length of the catheter assembly from the distal tip of the catheter to a proximal end of a catheter adapter may be between 0.5 inches and 12 inches, inclusive.

In some embodiments, the catheter assembly may include the catheter adapter, which may include a distal end, the proximal end, and a lumen extending through the distal end of the catheter adapter and the proximal end of the catheter adapter. In some embodiments, the catheter assembly may include the catheter, which may be secured within the catheter adapter. In some embodiments, the catheter may extend distally from the distal end of the catheter adapter. In some embodiments, the catheter may include a peripheral intravenous catheter, a peripherally inserted central catheter, or a midline catheter.

In some embodiments, the catheter assembly may include a needle assembly, which may include a needle hub and an introducer needle coupled to the needle hub. In some embodiments, the introducer needle may extend through the catheter and/or beyond the distal tip of the catheter. In some embodiments, the introducer needle may include a sharp distal tip.

In some embodiments, the catheter may include one or more fenestrations cut through a wall of the catheter. In some embodiments, the fenestrations may be disposed within a distal end of the catheter. In some embodiments, the fenestrations may be disposed anywhere along a length of the catheter. In some embodiments, the fenestrations may vary in shape or size. In some embodiments, the fenestrations may provide access to the lumen, which may increase a flow rate during infusion and blood draw as well as allow alternate flow paths through the catheter in response to a distal opening of the catheter being occluded by the wall of the vein or a valve.

In some embodiments, the anti-thrombogenic material may be extruded through a die to form the catheter and/or the catheter adapter. In some embodiments, the anti-thrombogenic material may be molded to form the catheter adapter. In some embodiments, the anti-thrombogenic material may include an anti-thrombogenic compound, which may include a fluoro moiety, a silicone moiety, a PEG moiety, or another suitable moiety. In some embodiments, the anti-thrombogenic material may include a polymer with the anti-thrombogenic compound. In some embodiments, the polymer may include polyurethane or silicone elastomer. In some embodiments, the anti-thrombogenic material comprises two or more of: a fluoro moiety; a silicone moiety; a PEG moiety; and another moiety. In some embodiments, an inner surface and/or an outer surface of the catheter adapter and/or the catheter may be coated with the anti-thrombogenic coating. In some embodiments, an inner surface and/or an outer surface of the introducer needle is coated with the anti-thrombogenic coating.

In some embodiments, the catheter assembly may include a wedge disposed within the lumen of the catheter adapter. In some embodiments, the catheter may be secured within the catheter adapter by the wedge. In some embodiments, the wedge may be coated with the anti-thrombogenic coating. In some embodiments, a septum may be disposed within the lumen of the catheter adapter. In some embodiments, the septum may be coated with the anti-thrombogenic coating. In some embodiments, the catheter assembly may include the septum, an actuator, and/or a spring disposed within the lumen of the catheter adapter. In some embodiments, one or more of the following may be coated with the anti-thrombogenic coating: the septum, the actuator, and the spring.

In some embodiments, the septum may be molded from the anti-thrombogenic material. In some embodiments, the catheter adapter may be molded from the anti-thrombogenic material. In some embodiments, the catheter adapter may include a side port in between the distal end of the catheter adapter and the proximal end of the catheter adapter and in fluid communication with the lumen. In some embodiments, the catheter adapter may include an extension tube, which may include a distal end and a proximal end. In some embodiments, the distal end of the extension tube may be coupled to the side port. In some embodiments, the proximal end of the extension tube may be coupled to a luer adapter.

In some embodiments, the anti-thrombogenic material may be extruded through the die to form one or more of: the catheter, the extension tube, the luer adapter, and the catheter adapter. In some embodiments, anti-thrombogenic material may be molded to form the luer adapter and/or the catheter adapter. In some embodiments, the catheter assembly may include a needleless access connector, which may be coupled to the luer adapter. In some embodiments, the anti-thrombogenic material may be extruded through the die and/or molded to form the needleless access connector.

In some embodiments, an outer surface and/or an inner surface of the needleless access connector may be coated with the anti-thrombogenic coating. In some embodiments, an outer surface and/or an inner surface of the extension tube may be coated with the anti-thrombogenic coating. In some embodiments, an outer surface and/or an inner surface of the luer adapter are coated with the anti-thrombogenic coating.

In some embodiments, a method of manufacturing the catheter assembly may include extruding the anti-thrombogenic material through a die to form one or more of the following: the catheter, the catheter adapter, the extension tube, the luer adapter, and the needleless access connector. In some embodiments, after extruding the anti-thrombogenic material through the die to form the catheter, the method may include cutting one or more fenestrations through a wall of a distal end of the catheter. In some embodiments, the method may include cutting the fenestrations through a wall of the distal end of the catheter, and after cutting the fenestrations through the wall of the distal end of the catheter, applying the anti-thrombogenic coating to the outer surface and/or the inner surface of the catheter. In some embodiments, the method of manufacturing the catheter assembly may include molding the anti-thrombogenic material to form one or more of the following: the catheter adapter, the luer adapter, and the needleless access connector.

In some embodiments, the method may include applying the anti-thrombogenic coating and/or an antimicrobial coating to one or more portions of an inner surface and/or an outer surface of the catheter assembly. In some embodiments, the method may include applying a heparin compound to the catheter assembly proximate all or a portion of the fluid path. In some embodiments, the method may include applying the anti-thrombogenic coating to the catheter assembly proximate all or a portion of the fluid path.

It is to be understood that both the foregoing general description and the following detailed description are examples and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying drawings in which.

DETAILED DESCRIPTION

Figure 1A:
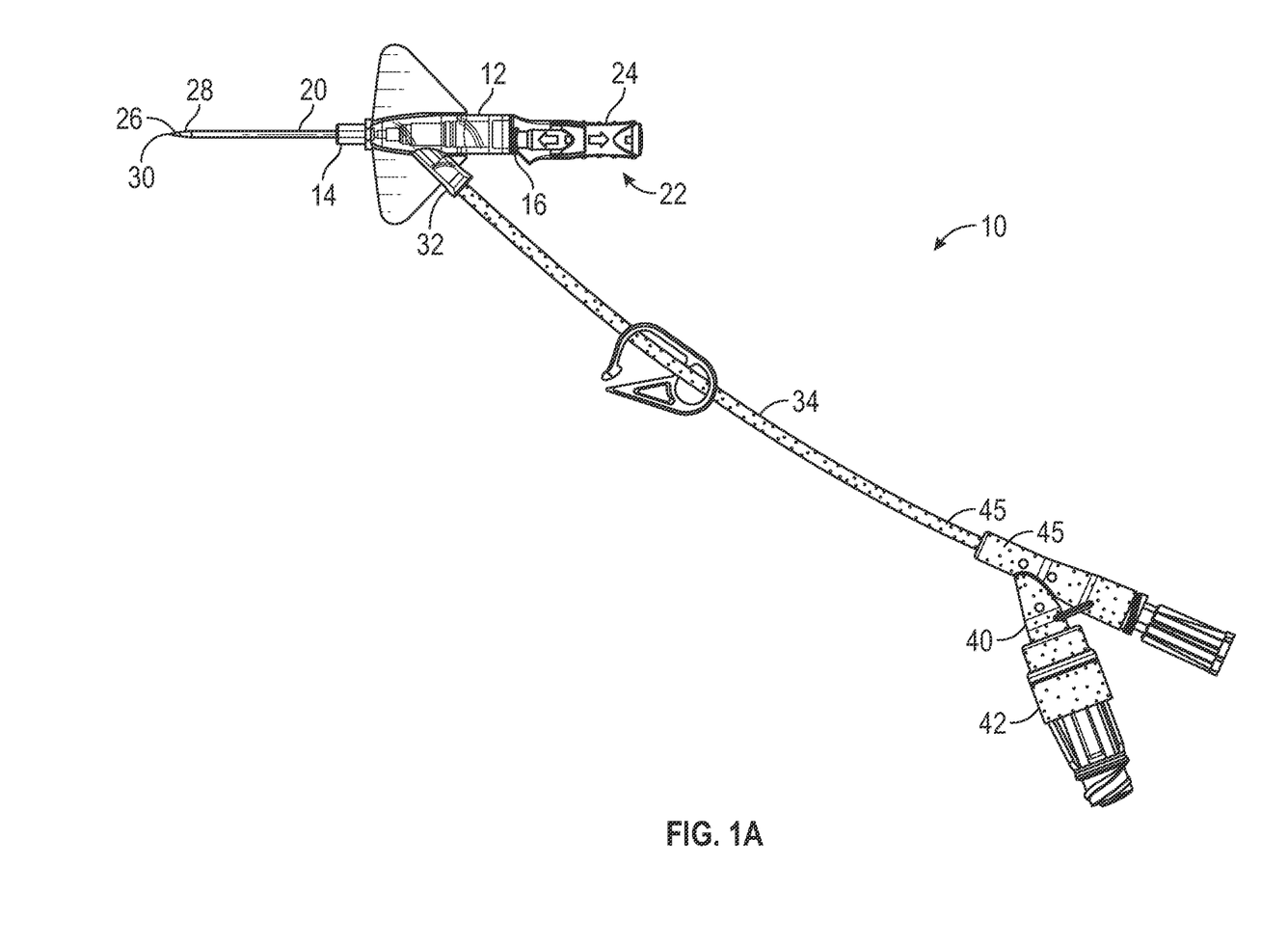
FIG. 1A is an upper perspective of an example catheter assembly, according to some embodiments.
Figure 1B:
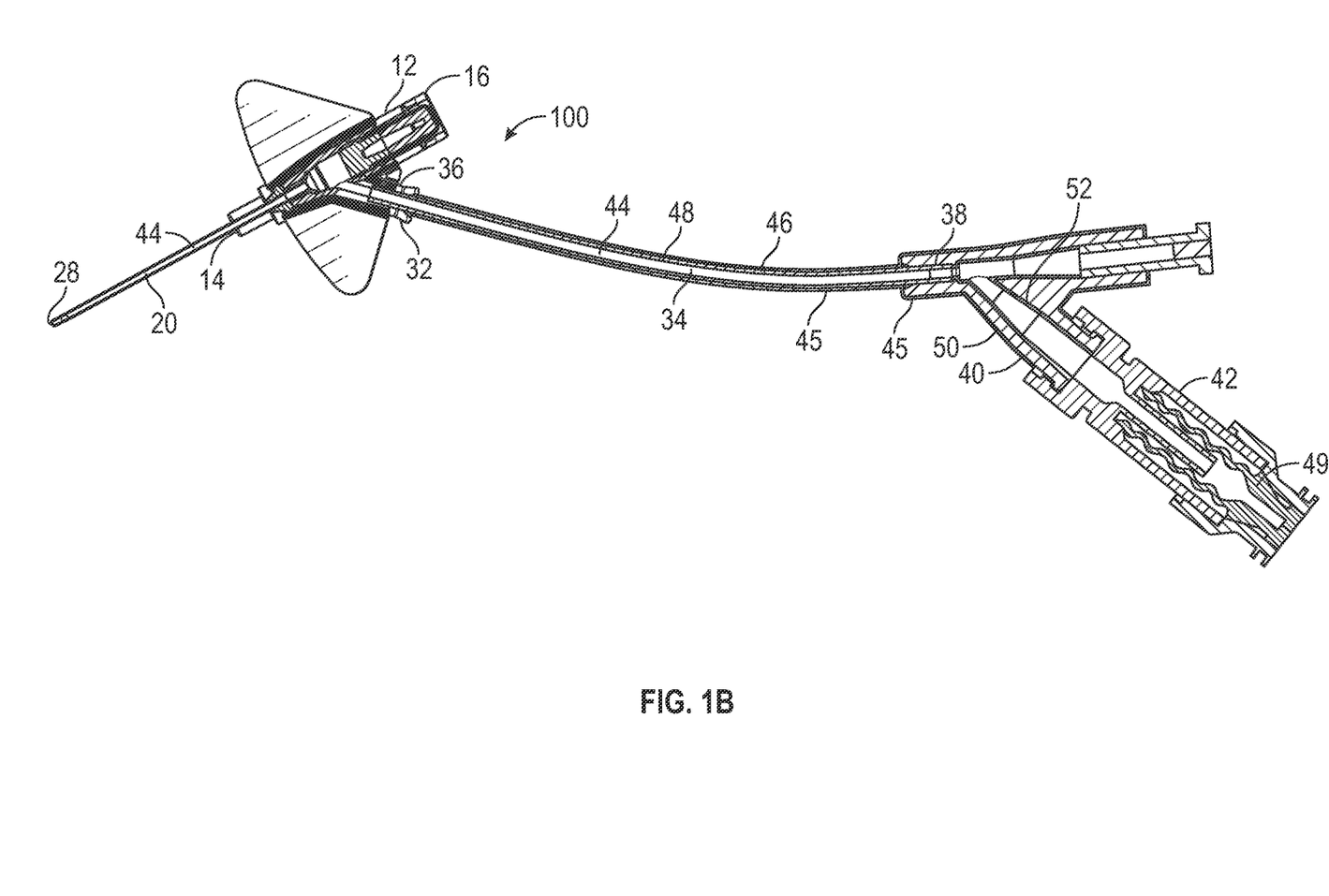
FIG. 1B is a cross-sectional view of the catheter assembly of FIG. 1A, illustrating an example needle assembly removed, according to some embodiments.

Referring now to FIGS. 1A-1B, a catheter assembly 10 is illustrated, according to some embodiments. In some embodiments, the catheter assembly 10 may include a catheter adapter 12, which may include a distal end 14, the proximal end 16, and a lumen 18 extending through the distal end 14 of the catheter adapter 12 and the proximal end 16 of the catheter adapter 12.

In some embodiments, the catheter assembly 10 may include a catheter 20, which may be secured within the catheter adapter 12. In some embodiments, the catheter 20 may extend distally from the distal end 14 of the catheter adapter 12. In some embodiments, the catheter 20 may include a peripheral intravenous catheter, a peripherally inserted central catheter, or a midline catheter.

In some embodiments, the catheter assembly 10 may include a needle assembly 22, which may include a needle hub 24 and an introducer needle 26 coupled to the needle hub 24. In some embodiments, the introducer needle 26 may extend through the catheter 20 and/or beyond a distal tip 28 of the catheter 20. In some embodiments, the introducer needle 26 may include a sharp distal tip 30.

In some embodiments, the catheter adapter 12 may include a side port 32 in between the distal end 14 of the catheter adapter 12 and the proximal end 16 of the catheter adapter 12 and in fluid communication with the lumen 18. In some embodiments, the catheter adapter 12 may include an extension tube 34, which may include a distal end 36 and a proximal end 38. In some embodiments, the distal end 36 of the extension tube 34 may be coupled to the side port 32. For example, the distal end 36 may be integrated with the side port 32. In some embodiments, the proximal end 38 of the extension tube 34 may be coupled to a luer adapter 40. For example, the proximal end 38 may be integrated with the luer adapter 40. In some embodiments, the luer adapter 40 may include a male or female connector.

In some embodiments, an anti-thrombogenic material may be extruded through a die to form one or more of: the catheter 20, the extension tube 34, the luer adapter 40, and the catheter adapter 12. In some embodiments, an anti-thrombogenic material may be molded to form the luer adapter 40 and/or the catheter adapter 12. In some embodiments, the catheter assembly 10 may include a needleless access connector 42, which may be coupled to the luer adapter 40. In some embodiments, the anti-thrombogenic material may be extruded through the die or molded to form the needleless access connector 42. It is understood that different dies or molds may be used to form different portions of the catheter assembly 10, according to some embodiments.

In some embodiments, the anti-thrombogenic material may include an anti-thrombogenic compound, which may include a fluoro moiety, a silicone moiety, a PEG moiety, or another suitable moiety. In some embodiments, the anti-thrombogenic material may include a polymer with the anti-thrombogenic compound. In some embodiments, the polymer may include polyurethane or silicone elastomer. In some embodiments, the anti-thrombogenic material comprises two or more of: a fluoro moiety; a silicone moiety; a PEG moiety; and another moiety. In some embodiments, one or more of the following may be molded from the anti-thrombogenic material: the catheter adapter 12, the luer adapter 40, and the needleless access connector 42.

In some embodiments, because the catheter assembly 10 include one or more anti-thrombogenic portions, which may include one or more portions extruded and/or molded from the anti-thrombogenic material, patency, fluid infusion, and blood draw may be enhanced. In further detail, the anti-thrombogenic portions may: 1) reduce trauma-induced and/or stasis-induced thrombus development; 2) reduce an amount of blood disposed within a fluid path 44 of the catheter assembly 10; and 3) prevent or delay thrombus development and attachment to the catheter 20 or another portion of the catheter assembly 10. In some embodiments, the anti-thrombogenic material may reduce a likelihood of formation of a fibrin sheath or thrombus on one or more of the following: an internal surface of the catheter assembly 10, an external surface of the catheter assembly 10, or within a vein near the distal tip 28 of the catheter 20.

In some embodiments, a length of the catheter 20 may be extended, which may facilitate infusion and blood draw success by moving the distal tip 28 further from the fibrin sheath or thrombus that may be present. In some embodiments, the length of the catheter 20 may be extended to orient the catheter 20 parallel to the vein or generally parallel to the vein, which may reduce a risk of an occlusion of the catheter 20 by a wall of the vein and/or a risk of thrombus on the wall of the vein. In some embodiments, the length of the catheter 20 may be extended to increase access to deeper and larger veins with higher blood flow and more favorable vein diameter ratios for a particular size of catheter 20, which may reduce a likelihood of stasis-related thrombus development. In some embodiments, a gauge of the catheter 20 may be between 26G and 10G, inclusive. In some embodiments, a length of the catheter 20 or a length of the catheter assembly 10 from the distal tip 28 of the catheter 20 to the proximal end 16 of the catheter adapter 12 may be between 0.5 inches and 12 inches, inclusive. In some embodiments, the catheter assembly 20 may include any suitable catheter assembly configured to insert into vasculature of a patient.

In some embodiments, one or more portions of an inner surface and/or an outer surface of the catheter assembly 10 may include an anti-thrombogenic coating 45, which may include the anti-thrombogenic material. In some embodiments, the anti-thrombogenic coating 45 may include a lubricant or another suitable coating. In some embodiments, the anti-thrombogenic coating 45 may be hydrophilic or hydrophobic. In some embodiments, one or more portions of the inner surface and/or the outer surface of the catheter assembly 10 may include an anti-microbial coating, which may include an anti-microbial compound, such as, for example, chlorhexidine, silver, or another suitable anti-microbial compound. In some embodiments, the anti-microbial coating may include multiple anti-microbial compounds and/or the anti-thrombogenic coating 45 may include multiple anti-thrombogenic compounds.

In some embodiments, the anti-thrombogenic coating 45 may be applied to the catheter assembly 10 proximate all or a portion of the fluid path 44. Additionally or alternatively, in some embodiments, the anti-microbial coating may be applied to the catheter assembly 10 proximate all or a portion of the fluid path 44. In some embodiments, a heparin compound may be applied to the catheter assembly 10 proximate all or a portion of the fluid path 44.

In some embodiments, all or a portion of an outer surface 46 of the extension tube 34 and/or all or a portion of an inner surface 48 of the extension tube 34 may be coated with the anti-thrombogenic coating 45. In some embodiments, all or a portion of an outer surface 50 of the luer adapter 40 and/or all or a portion of an inner surface 52 of the luer adapter 40 may be coated with the anti-thrombogenic coating 45. In some embodiments, one or more other portions of the catheter assembly 10 may be coated with the anti-thrombogenic coating 45, as will be explained in further detail.

Figure 1C:
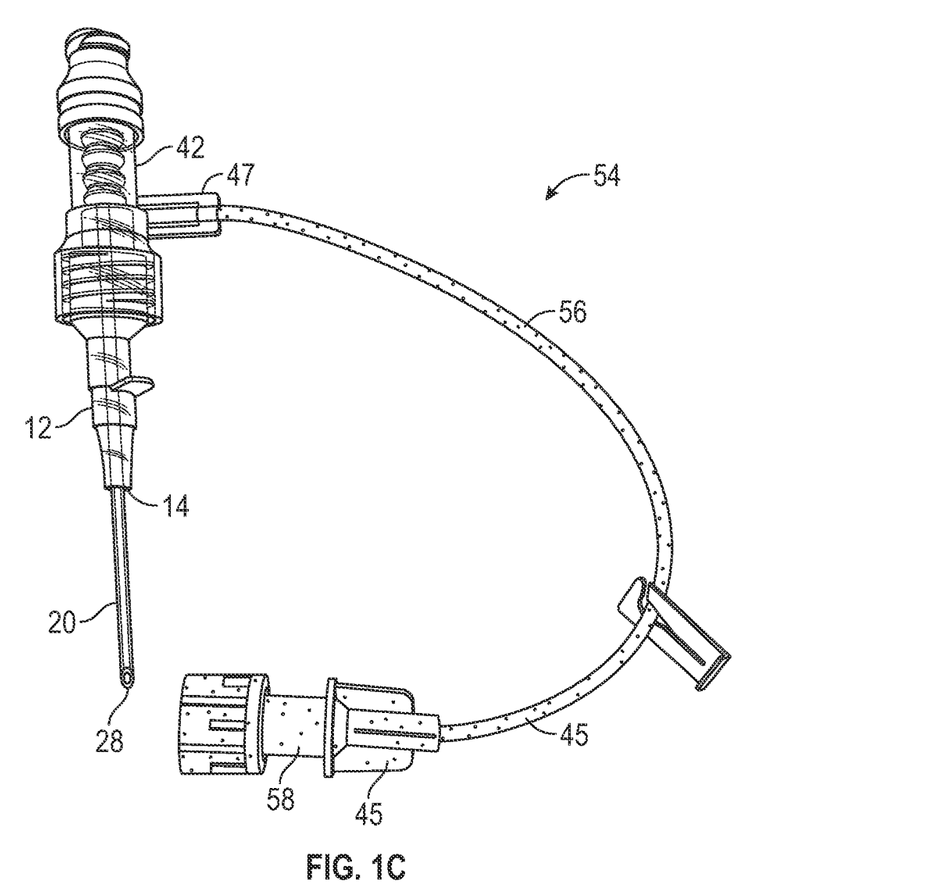
FIG. 1C is an upper perspective view of another example catheter assembly, according to some embodiments.

Referring now to FIG. 1C, a catheter assembly 54 is illustrated, according to some embodiments. In some embodiments, the catheter assembly 54 may be similar or identical to the catheter assembly 10 in terms of one or more features and/or operation. In some embodiments, the catheter assembly 54 may include the catheter adapter 12, which may include the distal end 14, the proximal end 16, and the lumen extending through the distal end 14 of the catheter adapter 12 and the proximal end 16 of the catheter adapter 12.

In some embodiments, the catheter assembly 54 may include the catheter 20, which may be secured within the catheter adapter 12. In some embodiments, the catheter 20 may extend distally from the distal end 14 of the catheter adapter 12. In some embodiments, the catheter 20 may include a peripheral intravenous catheter, a peripherally inserted central catheter, or a midline catheter.

In some embodiments, the catheter assembly 54 may include a needle assembly (not illustrated), which may include a needle hub and an introducer needle coupled to the needle hub. In some embodiments, the introducer needle may extend through the catheter 20 and/or beyond the distal tip 28 of the catheter 20. In some embodiments, the introducer needle 26 may include a sharp distal tip.

In some embodiments, in response to the needle assembly 22 being removed from the catheter adapter 12 and the catheter assembly 54, the needleless access connector 42 may be coupled to the proximal end 16 of the catheter adapter 12. In some embodiments, the needleless access connector 42 may include a side port 47, which may extend outwardly from the needleless access connector distal to a septum 49 of the needleless access connector 42 (see also, FIG. 1B, for example). In some embodiments, in response to insertion of a medical device within a proximal port of the needleless access connector 42, the septum 49 may be compressible in a distal direction to open the proximal port of the needleless access connector 42 and allow fluid to flow through the needleless access connector 42.

In some embodiments, a distal end of an extension tube 56 may be coupled to or integrated with the side port 47. In some embodiments, the extension tube 56 may be similar or identical to the extension tube 34 of FIGS. 1A-1B in terms of one or more features and/or operation. For example, the extension tube 56 may include the anti-thrombogenic coating 45 and/or may be extruded from the anti-thrombogenic material.

In some embodiments, the proximal end of the extension tube 56 may be coupled or integrated with a luer adapter 58. In some embodiments, the luer adapter 58 may be similar or identical to the luer adapter 40 of FIGS. 1A-1B in terms of one or more features and/or operation. For example, the luer adapter 58 may include the anti-thrombogenic coating 45 and/or may be extruded from the anti-thrombogenic material. As another example, the luer adapter 58 may be molded from the anti-thrombogenic material.

Figure 1D:
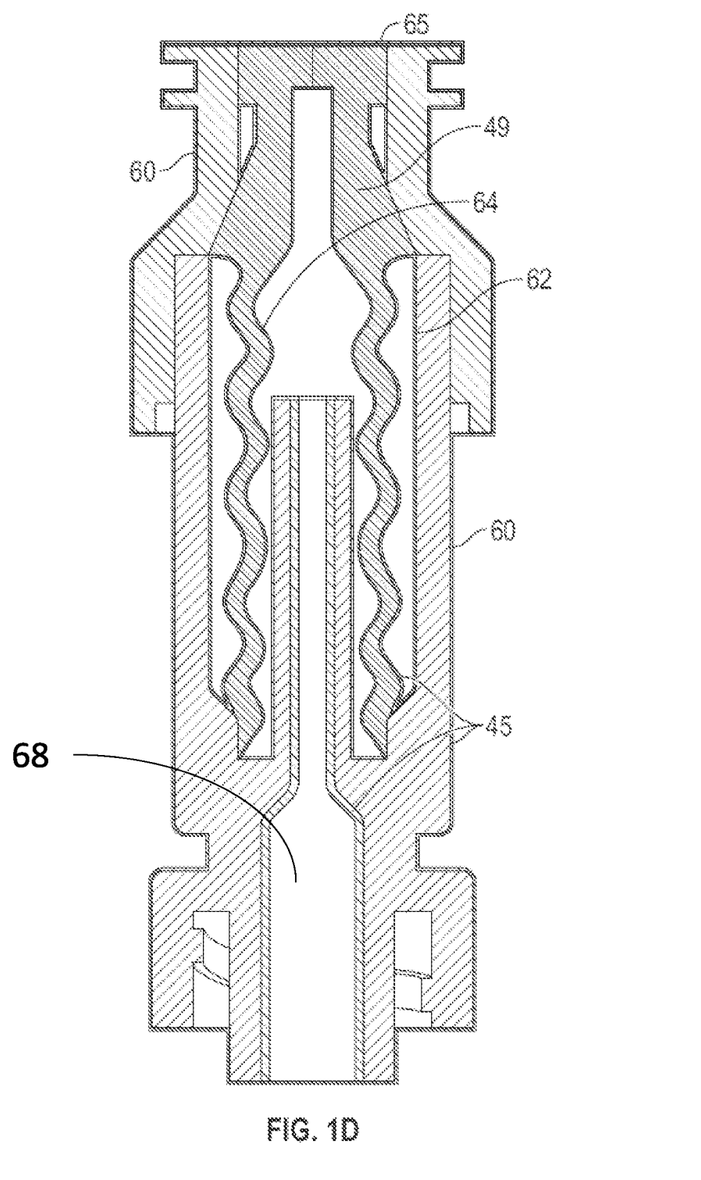
FIG. 1D is a cross-sectional view of an example needleless connector, according to some embodiments.

Referring now to FIG. 1D, in some embodiments, all or a portion of an outer surface 60 of the needleless access connector 42 and/or all or a portion of an inner surface 62 of the needleless access connector 42 may be coated with the anti-thrombogenic coating 45. In some embodiments, all or a portion of a surface 64 of the septum 49 may be coated with the anti-thrombogenic coating 45. For example, a proximal end 65 of the septum 49 may be coated with the anti-thrombogenic coating 45. Additionally or alternatively, one or more of the following may be partially or fully coated with the anti-microbial coating: the outer surface 60 of the needleless access connector 42, the inner surface 62 of the needleless access connector 42, and the surface 64 of the septum 49.

Figure 2:
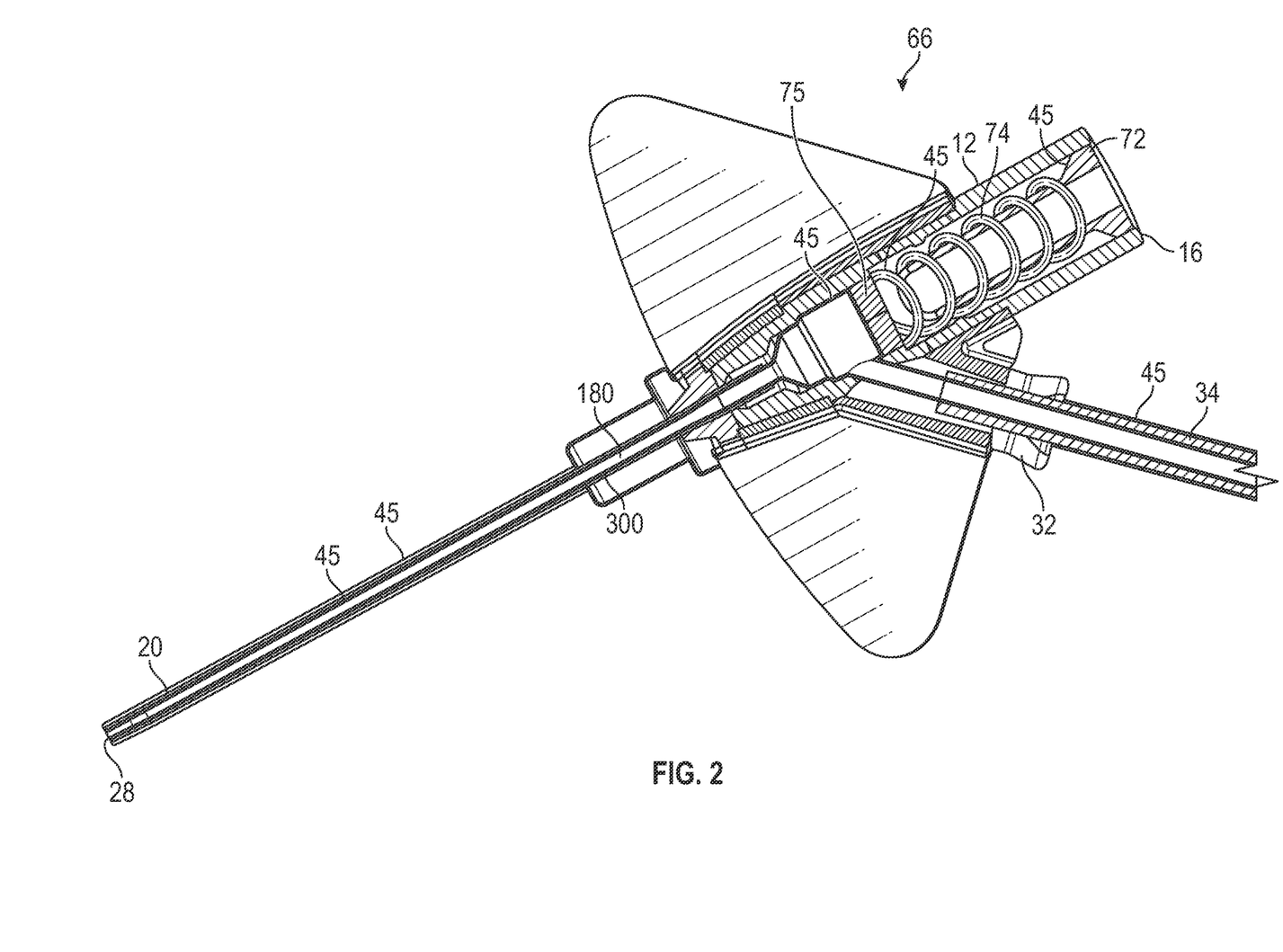
FIG. 2 is a cross-sectional view of another example catheter assembly, according to some embodiments.

Referring now to FIG. 2, a catheter assembly 66 is illustrated, according to some embodiments. In some embodiments, the catheter assembly 66 may be similar or identical to the catheter assembly 10 of FIGS. 1A-1B and/or the catheter assembly 54 of FIG. 1C in terms of one or more features and/or operation. In some embodiments, all or a portion of an inner surface of the catheter 20 and/or all or a portion of an outer surface of the catheter 20 may be coated with the anti-thrombogenic coating 45, as illustrated, for example, in FIG. 2. In some embodiments, all or a portion of an inner surface of the catheter adapter 12 and/or all or a portion of an outer surface of the catheter adapter 12 may be coated with the anti-thrombogenic coating 45, as illustrated, for example, in FIG. 2.

In some embodiments, the catheter assembly 66 may include a wedge 68 disposed within the lumen 18 of the catheter adapter 12. In some embodiments, the catheter 20 may be secured within the catheter adapter 12 by the wedge 68. In some embodiments, the wedge 68 may be annular and may include a larger inner diameter at a proximal end of the wedge 68 than a distal end of the wedge 68. In some embodiments, all or a portion of the wedge 68 may be coated with the anti-thrombogenic coating 45, as illustrated, for example, in FIG. 2. In some embodiments, a septum 70 may be disposed within the lumen 18 of the catheter adapter 12. In some embodiments, all or a portion of a surface of the septum 70 may be coated with the anti-thrombogenic coating 45. As illustrated, in FIG. 2, in some embodiments, all or a portion of the outer surface of the extension tube 34 may be coated with the anti-thrombogenic material.

In some embodiments, the catheter assembly 66 may include the septum 70, an actuator 72, and/or a spring 74 disposed within the lumen 18. In some embodiments, the spring 74 may be coupled to the actuator 72 may be bias the actuator 72 in a proximal position such that the septum is closed in response to removal of a medical device from the proximal end 16 of the catheter adapter 12. In some embodiments, the actuator 72 may be configured to move distally and open the septum 70 in response to insertion of the medical device within the proximal end 16 of the catheter adapter 12. In some embodiments, one or more of the following may be fully or partially coated with the anti-thrombogenic coating 45: the septum 70, the actuator 72, and the spring 74. In some embodiments, the septum 70 and/or the actuator 72 may be molded from the anti-thrombogenic material.

Figure 3:
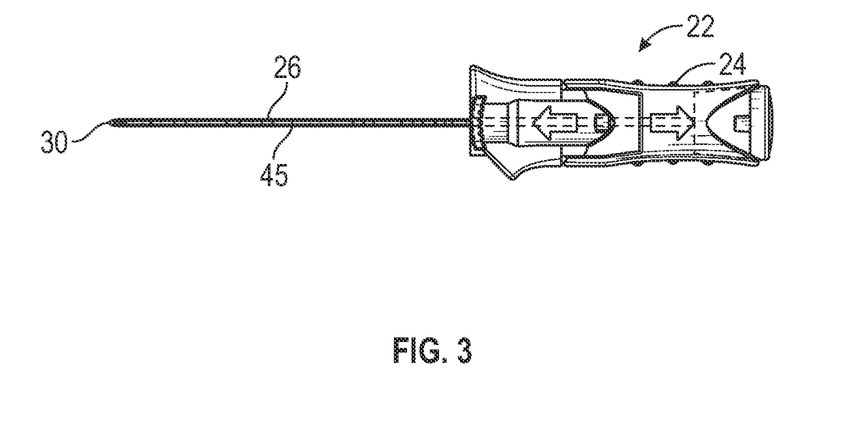
FIG. 3 is an upper perspective view of an example needle assembly, according to some embodiments.

Referring now to FIG. 3, in some embodiments, all or a portion of an inner surface of and/or all or a portion of an outer surface of the introducer needle 26 of the needle assembly 22 may be coated with the anti-thrombogenic coating 45. In some embodiments, a proximal end of the introducer needle 26 may be secured within the needle hub 24.

Figure 4:
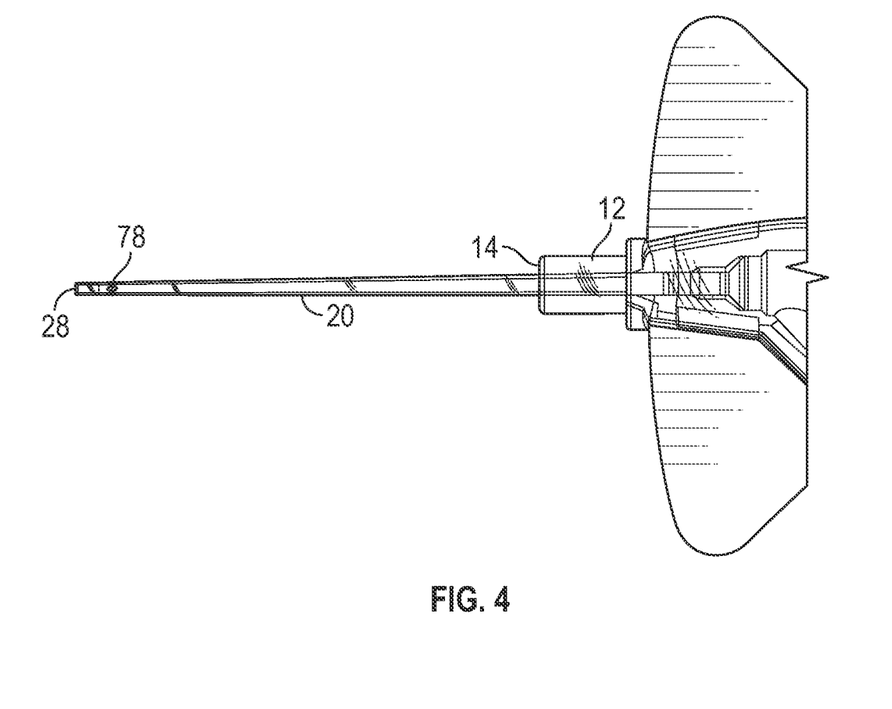
FIG. 4 is an upper perspective view of an example distal end of a catheter assembly, according to some embodiments.

Referring now to FIG. 4, a distal end of a catheter assembly 76 is illustrated, according to some embodiments. In some embodiments, the catheter assembly 76 may be similar or identical to one or more of the following in terms of one or more features and/or operation: the catheter assembly 10 of FIGS. 1A-1B, the catheter assembly 54 of FIG. 1C, and the catheter assembly 66 of FIG. 2.

In some embodiments, the catheter 20 may include one or more fenestrations 78 cut through a wall of the catheter 20. In some embodiments, the fenestrations may be disposed within a distal end 80 of the catheter 20. In some embodiments, the fenestrations 78 may be disposed anywhere along a length of the catheter 20. In some embodiments, the fenestrations 78 may vary in shape or size. In some embodiments, the fenestrations 78 may provide access to the lumen 18 (see, for example, FIG. 1B or FIG. 2), which may increase a flow rate during infusion and blood draw as well as allow alternate flow paths through the catheter 20 in response to a distal opening 82 of the catheter 20 being occluded by the wall of the vein or a valve.

In some embodiments, a method of manufacturing the catheter assembly 76 may include extruding the anti-thrombogenic material through a die to form the catheter 20. In some embodiments, after extruding the anti-thrombogenic material through the die to form the catheter 20, the method may include cutting the fenestrations 78 through the wall of the distal end 80 of the catheter 20. In some embodiments, the method may include cutting the fenestrations 78 through the wall of the distal end 80 of the catheter 20, and after cutting the fenestrations 78 through the wall of the distal end 80 of the catheter 20, applying the anti-thrombogenic coating 45 to the outer surface and/or the inner surface of the catheter 20.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

We claim:

1. A catheter assembly, comprising:
   a catheter adapter, comprising a body, a distal end, a proximal end, and a lumen extending through the body from the distal end of the catheter adapter to the proximal end of the catheter adapter;
   a catheter extending distally from the distal end of the catheter adapter, wherein the catheter comprises a body; and
   an introducer needle extending through the catheter,
   wherein the body of the catheter adapter consists of an anti-thrombogenic material, and
   wherein the anti-thrombogenic material of the body of the catheter adapter forms the lumen.

2. The catheter assembly of claim 1, wherein the body of the catheter is made of the anti-thrombogenic material.

3. The catheter assembly of claim 2, wherein a distal end of the catheter comprises a plurality of fenestrations cut through a wall of the catheter.

4. The catheter assembly of claim 1, wherein the anti-thrombogenic material comprises two or more compounds comprising a silicone moiety or a PEG moiety.

5. The catheter assembly of claim 1, wherein an inner surface or an outer surface of the catheter is coated with an anti-thrombogenic coating.

6. The catheter assembly of claim 1, wherein an inner surface or an outer surface of the introducer needle is coated with an anti-thrombogenic coating.

7. The catheter assembly of claim 1, further comprising a wedge disposed within the lumen of the catheter adapter, wherein the catheter is secured within the catheter adapter by the wedge, wherein the wedge is coated with an anti-thrombogenic coating.

8. The catheter assembly of claim 1, further comprising a septum disposed within the lumen of the catheter adapter, wherein the septum is coated with an anti-thrombogenic coating.

9. The catheter assembly of claim 1, further comprising a septum, actuator, and spring disposed within the lumen of the catheter adapter, wherein the septum, the actuator, or the spring are coated with an anti-thrombogenic coating.

10. The catheter assembly of claim 1, further comprising a septum disposed within the lumen of the catheter adapter, wherein the septum is made of the anti-thrombogenic material or another anti-thrombogenic material.

11. The catheter assembly of claim 1, wherein the body of the catheter is made of the anti-thrombogenic material, wherein the body of the catheter adapter is made of another anti-thrombogenic material or the anti-thrombogenic material.

12. A catheter assembly, comprising:
    a catheter adapter, comprising a body, a distal end, a proximal end, a lumen extending through the body from the distal end of the catheter adapter to the proximal end of the catheter adapter, and a side port in between the distal end of the catheter adapter and the proximal end of the catheter adapter and in fluid communication with the lumen;
    a catheter extending distally from the distal end of the catheter adapter, the catheter comprising a body;
    an extension tube, comprising a distal end and a proximal end, wherein the distal end of the extension tube is coupled to the side port, wherein the proximal end of the extension tube is coupled to a luer adapter; and
    an introducer needle extending through the catheter,
    wherein the body of the catheter adapter consists of an anti-thrombogenic material, and
    wherein the anti-thrombogenic material of the body of the catheter adapter forms the lumen.

13. The catheter assembly of claim 12, wherein the body of the catheter is made of the anti-thrombogenic material.

14. The catheter assembly of claim 13, wherein a distal end of the catheter comprises a plurality of fenestrations cut through a wall of the catheter.

15. The catheter assembly of claim 12, wherein the extension tube, or the luer adapter is made of the anti-thrombogenic material.

16. The catheter assembly of claim 12, wherein the anti-thrombogenic material comprises two or more compounds comprising a silicone moiety or a PEG moiety.

* * * * *